(12) United States Patent
Westman et al.

(10) Patent No.: US 8,786,505 B2
(45) Date of Patent: Jul. 22, 2014

(54) ANTENNA ALIGNMENT FIXTURE

(75) Inventors: Aaron L. Westman, Brewerton, NY (US); John F. Strempel, Marcellus, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 108 days.

(21) Appl. No.: 13/371,883

(22) Filed: Feb. 13, 2012

(65) Prior Publication Data

US 2013/0207860 A1   Aug. 15, 2013

(51) Int. Cl.
    *H01Q 3/00* (2006.01)
(52) U.S. Cl.
    USPC ............ 343/760; 343/703; 343/761; 343/757
(58) Field of Classification Search
    CPC ........................................................ H01Q 3/00
    USPC .......................................................... 343/760
    See application file for complete search history.

(56) References Cited

U.S. PATENT DOCUMENTS

| | | | |
|---|---|---|---|
| 3,106,782 A | 10/1963 | Carroll, Jr. | |
| 6,732,439 B1 * | 5/2004 | Radke et al. | 33/286 |
| 6,779,632 B1 * | 8/2004 | Parks, III | 182/204 |
| 7,278,218 B2 * | 10/2007 | Levine | 33/286 |
| 7,548,305 B1 | 6/2009 | Pedreiro et al. | |
| 7,669,339 B1 * | 3/2010 | Arnal et al. | 33/286 |
| 2001/0043328 A1 * | 11/2001 | Barish | 356/399 |
| 2003/0038933 A1 | 2/2003 | Shirley et al. | |
| 2007/0052606 A1 | 3/2007 | Gold | |
| 2008/0278386 A1 * | 11/2008 | Hall et al. | 343/703 |

OTHER PUBLICATIONS

International Search Report dated Apr. 19, 2013 for counterpart International Application No. PCT/US2013/025942.

* cited by examiner

*Primary Examiner* — Jerome Jackson, Jr.
*Assistant Examiner* — Andrea Lindgren Baltzel
(74) *Attorney, Agent, or Firm* — Howard IP Law Group, PC

(57) ABSTRACT

An alignment apparatus configured to be mounted to a radar array antenna having a generally planar face for aligning the antenna includes a rigid frame defining a plane generally parallel to the face of the antenna when the rigid frame is mounted to the antenna. A flexible member is associated with the rigid frame and is configured to flex relative to the rigid frame. The apparatus further includes an optical source for emitting a light beam and a target. One of the optical source and the target is associated with the flexible member and the other of the optical source and the target is associated with the rigid frame. A distance between the path of the light beam and the target is indicative of the degree of misalignment between the flexible member and the rigid frame.

20 Claims, 4 Drawing Sheets

ANTENNA ALIGNMENT FIXTURE

Statement of Government Interest

This invention was made with Government support under Contract No. W15P7T-06-C-T004. The Government has certain rights in this invention.

FIELD OF INVENTION

The present invention relates generally to fixtures, and more particularly, to fixtures for radar antennas.

BACKGROUND

Radar array antennas have been installed on mobile platforms, such as trucks, for rapid deployment in the field. Such antennas may be transported in a stowed position and erected to an operational position at a target location. Elevation systems have been used to configure radar array antennas on the mobile platforms to their stowed and operational positions, respectively. For antennas having relatively large array apertures, the antenna's twist error budget tends to be reduced and the flatness of the antenna becomes a more significant factor. Current techniques for ensuring appropriate antenna flatness are expensive, labor-intensive and time-consuming. For example, one technique for determining the relative flatness of an antenna involves expensive equipment such as a laser scanner, which may not be suitable for use in austere environments. Furthermore, required calibration equipment tends to be heavy and requires trained workforce to flatten the antennas to the desired level. Alternative systems and methods are desired.

SUMMARY

According to an embodiment of the invention, an apparatus configured to be mounted to a radar array antenna having a generally planar face for aligning the antenna includes a rigid frame defining a plane generally parallel to the front face of the antenna when the rigid frame is mounted to the antenna. A flexible member is associated with the rigid frame and is configured to flex relative to the rigid frame. The apparatus further includes an optical source for emitting a light beam and a target. One of the optical source and the target is associated with the flexible member and the other of the optical source and the target is associated with the rigid frame. A distance, if any, between the path of the light beam and the target is indicative of the degree of misalignment between the flexible member and the rigid frame. The misalignment between the flexible member and the rigid frame is indicative of a twist in the front face of the antenna.

According to an embodiment of the invention, an alignment apparatus for aligning an elevation system of a radar array antenna includes a generally planar, rigid frame for mounting to a front face of the antenna. The apparatus further includes first, second and third legs rigidly attached to the frame and configured to rigidly attach to the antenna. A flexible member is associated with the rigid frame. A fourth leg is associated with the flexible member and is configured to rigidly attach to the antenna. The apparatus further includes an optical source and a target. One of the optical source and the target is associated with the flexible member. The other of the optical source and the target is associated with the rigid frame. The optical source and the target are configured to cooperatively indicate any misalignment of the flexible member relative to the rigid frame. The misalignment between the flexible member and the rigid frame is indicative of a twist in the front face of the antenna.

According to another embodiment of the invention, a method for adjusting planar alignment of a front face of a radar array antenna includes the step of rigidly mounting an alignment apparatus spanning across the front face of the antenna with the antenna in a stowed position. The alignment apparatus includes a rigid frame configured to be mounted to the antenna and first, second and third legs rigidly associated with the rigid frame. A fourth leg is flexibly associated with the rigid frame. The apparatus further includes a flexible member for flexibly associating the fourth leg with the rigid frame. The flexible member is flexible relative to the rigid frame. The apparatus includes an optical source and a target. One of the optical source and the target is associated with the flexible member and the other of the optical source and the target is associated with the rigid frame. The method further includes the steps of causing an actuator to raise the antenna from the stowed position to a generally deployed position and causing the optical source to emit a light beam generally toward the target. The method further includes the step of causing the actuator to adjust the position of the antenna if the light beam is no incident upon the target, until the light beam is incident upon the target.

BRIEF DESCRIPTION OF THE DRAWINGS

Understanding of the present invention will be facilitated by consideration of the following detailed description of the exemplary embodiments of the present invention taken in conjunction with the accompanying drawings, in which like numerals refer to like parts and in which.

DETAILED DESCRIPTION

It is to be understood that the figures and descriptions of the various embodiments of the invention have been simplified to illustrate elements that are relevant for a clear understanding of the disclosed alignment fixtures, while eliminating, for purposes of clarity, many other elements found in such fixtures. However, because such elements are well known in the art, and because they do not facilitate a better understanding of the present invention, a discussion of such elements is not provided herein. The disclosure herein is directed to all such variations and modifications known to those skilled in the art.

Figure 1:
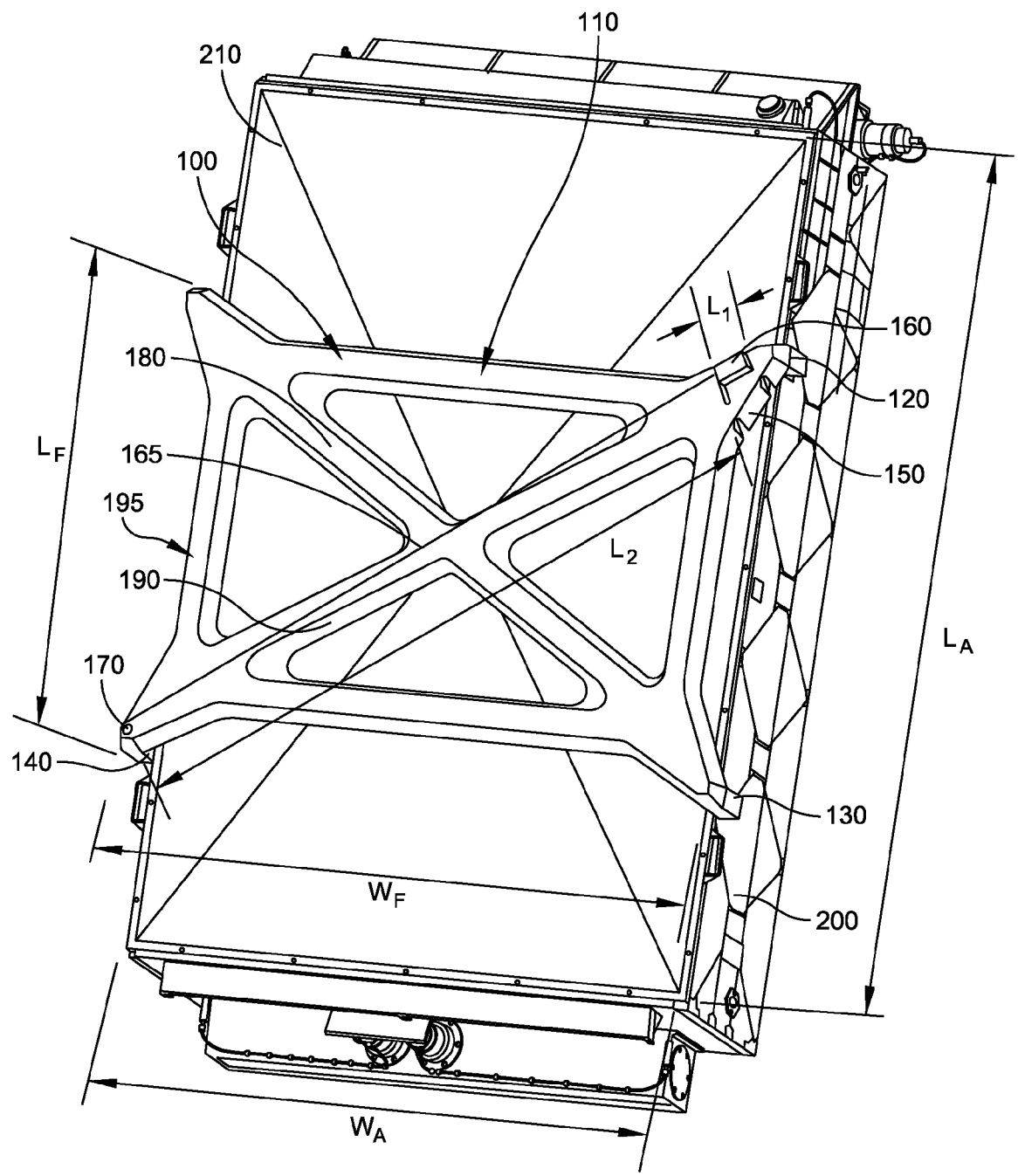
FIG. 1 illustrates an alignment apparatus mounted to a front face of a radar array antenna, according to an embodiment of the invention.

Referring to FIG. 1, an alignment apparatus or fixture 100 mounted to a radar array antenna 200 is illustrated according to an embodiment of the invention. In the illustrated embodiment, apparatus 100 is mounted spanning across a generally planar front face 210 of antenna 200. Apparatus 100 includes a generally rigid frame 110 and legs 120, 130, 140 associated therewith, according to an exemplary embodiment of the invention. Although FIG. 1 identifies three legs 120, 130, 140, fixture 100 includes a total of four legs, each one of which is associated with a corner of rigid frame 110, configured to mount fixture 100 to antenna 200, according to an embodiment of the invention. Rigid frame 110 is configured to lie in a plane generally parallel to a surface to which apparatus 100 is mounted. In the illustrated embodiment, rigid frame 110 lies in a plane generally parallel to front face 210.

Apparatus 100 further includes a flexible member 150 associated with rigid frame 110. Flexible member 150 couples leg 120 to rigid frame 110, according to an embodiment of the invention. Flexible member 150 is configured to be flexible relative to rigid frame 110 and to leg 120. In one configuration, flexible member 150 lies in a plane generally parallel to the plane of rigid frame 110. Flexible member 150 is configured to flex relative to the plane of rigid frame 110 responsive to an external force in one configuration. Flexible member 150 may also flex axially relative to rigid frame 110, responsive to an external force, in another configuration. In one configuration, if apparatus 100 mounted to antenna 200 is subject to a twisting force, flexible member 150 may flex relative to the plane of rigid frame 110. Such a twisting force may be generated, by way of non-limiting example, by uneven elevation of antenna 200 from a stowed position.

Apparatus 100 further includes an optical source 160 and a target 170. Optical source 160 is configured to emit a light beam 165. In the illustrated embodiment, optical source 160 is rigidly associated with flexible member 150 and target 170 is rigidly associated with rigid frame 110. In other configurations, optical source 160 may be rigidly associated with rigid frame 110 and target 170 may be rigidly associated with flexible member 150. If flexible member 150 lies generally parallel to the plane of rigid frame 110 and is generally axially aligned with rigid frame 110, light beam 165 emitted by optical source 160 is incident on target 170. However, if flexible member 150 has flexed relative to rigid frame 110, light beam 165 emitted by optical source 160 will not be incident on target 170, thereby indicating that flexible member 150 has flexed relative to rigid frame 110 and that front face 210 is not acceptably flat. Therefore, the distance, if any, between the path of light beam 165 and target 170 is indicative of the degree of misalignment between flexible member 150 and rigid frame 110.

In the illustrated embodiment, rigid frame 110 includes first and second beams 180, 190 in a generally "X-shaped" configuration. Beams 180, 190 are coupled to a rectangular frame 195, according to an embodiment of the invention. Rectangular frame 195 supports beams 180, 190 and provides structural rigidity to rigid frame 110. The frame and beams may be configured as a monolithic structure. In the illustrated embodiment, flexible member 150, along with optical source 160, is associated with one end of beam 190 and target 170 is associated with the other end of beam 190. Beam 190 has a length $L_1$ and flexible member 150 has a length $L_2$. The distance between optical source 160 and target 170 corresponds generally to length $L_1$ of beam 190, according to an embodiment of the invention. In an exemplary embodiment, the ratio of lengths $L_2$ to $L_1$ may range from about 40 to 60. In one configuration, length $L_1$ of flexible member 150 may range from about one (1) to four (4) inches. As will be described in further detail below, the greater the ratio of lengths $L_2$ to $L_1$, the greater the distance between optical source 160 and target 170 and the more sensitive the combination of optical source 160 and target 170 to any planar and/or axial misalignment between flexible member 150 and rigid frame 110.

Still referring to FIG. 1, rigid frame 110 has a width $W_F$, which generally corresponds to a width $W_A$ of antenna 200, according to an exemplary embodiment of the invention, but may be adapted to any span needing flattening. The ratio of a length $L_F$ of rigid frame 110 to a length $L_A$ of antenna 200 may range from about 0.5 to 1.0. according to the desired accuracy, by way of non-limiting example only. An increase in the ratio of lengths $L_F$ to $L_A$ results in an increase in length $L_2$ of beam 190, which, in turn, increases the distance between optical source 160 and target 170 in the illustrated embodiment. Thus, the greater the ratio of length $L_F$ of rigid frame 100 to length $L_A$ of antenna 200, the greater the distance between optical source 160 and target 170 and the higher the sensitivity of the combination of optical source 160 and target 170 to the flexing of flexible member 150 relative to rigid frame 110. However, the greater the ratio of length $L_F$ of rigid frame 110 to length $L_A$ of antenna, the larger the size of fixture 100. The appropriate ratio of lengths $L_F$ and $L_A$ may, therefore, be selected based on the requirements of a given application, such as the portability of fixture 100 as determined by the size and the weight of fixture 100. Additional factors relevant to determining the appropriate length ratio include design limits for the particular item to be measured. By way of non-limiting example, the structures may be so tightly packed that additional mounting provisions desirable for a sufficiently high $L_F/W_F$ ratio fixture may not be feasible.

Rigid frame 110 may be manufactured using a composite material such as a carbon fiber composite and other carbon composites. Materials suitable for manufacture of rigid frame 110 may be selected having high weight-to-stiffness ratios. Carbon fiber composites have a very high weight to stiffness ratio and so are particularly well suited for such applications, however, it is understood that other stiff yet lightweight materials may be utilized. As is known in the art, carbon fiber composites and other carbon composites have a significantly greater strength to weight ratio compared to that of conventional metals such as iron and aluminum and alloys such as steels. It is further known in the art that a carbon fiber has a significant stiffness particularly along the axial direction of the carbon fiber. Thus, rigid frame 110 manufactured from carbon fiber composites and other carbon composites may have the required strength and stiffness while being light enough to be lifted by an individual. Flexible member 150 is a high strain-to-yield material sufficiently strong to be handled by field personnel. In one embodiment, flexible member 150 may be a fiberglass material, or may be manufactured from a composite fabric made from glass-reinforced plastic (GRP) sheets or glass fiber-reinforced plastic (GFRP) sheets.

Flexible member 150 is sufficiently stiff so as to maintain its planar orientation relative to the plane of rigid frame 110 when subject to forces below a predetermined threshold. For example, gravitational force acting on leg 120 is not sufficient to flex flexible member 150 relative to the plane of rigid frame 110. Flexible member 150 is configured to flex relative to rigid frame 110 when subject to a force greater than the predetermined threshold. The ratio of the deflection of the tube structure relative to the deflection of the hinge should be 5 to 20. The deflection or axial stiffnesses of flexible member 150 and beam 190 refer to the deflection in the direction generally along the path between optical source 160 and target 170.

Optical source 160 may take the form of a laser source, such as an adjustable beam laser source operating in the visible range of about 400 nanometers (nm) to about 700 nm, according to an embodiment of the invention. Target 170 may take the form of a protrusion projecting from rigid frame 110. In one configuration, target 170 may include a bolt or a similar structure projecting upright from rigid frame 110. In another configuration, target 170 may take the form of an optical sensor, configured to detect light beam 165 emitted from optical source 160. Such an optical sensor may also be configured to provide an audible signal indicative of a detection of light beam 165, according to an embodiment of the invention.

An exemplary application of alignment apparatus 100 is to align the flatness of radar array antenna 200 in the field. As is known in the art, radar array antennas deployed in the field may be stowed when in a non-operational state. One or more actuators may be employed to elevate a stowed radar array antenna into an operational position. When the antennas are initially deployed, the flatness of the front faces of the antennas may be aligned in the factory using sophisticated laboratory equipment. However, if one or more actuators need to be replaced in the field, the antenna has to be realigned for flatness in the field. Using sophisticated laboratory equipment in the field to align the flatness of the antenna may not be feasible or practical due to various constraints such as costs, lack of skilled manpower and difficulties in transporting such laboratory equipment to the field. Alignment fixture 100 disclosed herein may be used by a single individual with a minimal training to align the flatness of a radar array antenna in the field.

Figure 2:
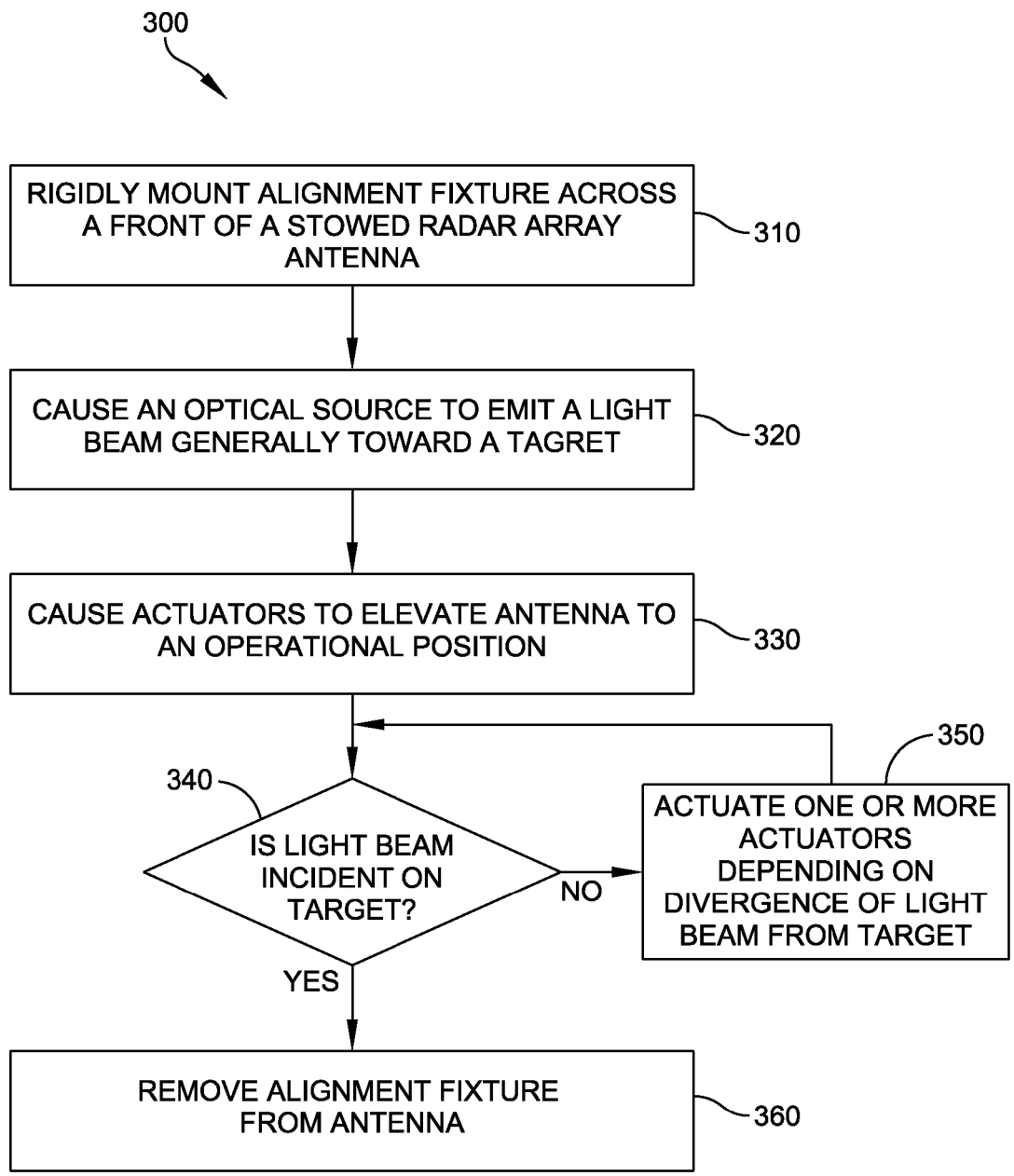
FIG. 2 is a process flow for aligning the flatness of a radar array antenna using the alignment apparatus of FIG. 1, according to an embodiment of the invention.

Referring now to FIG. 2, a process 300 for using apparatus 100 for aligning an antenna 200, for example, after an actuator has been replaced in the field, will be described, according to an embodiment of the invention. At block 310, alignment apparatus or fixture 100 is rigidly mounted across front face 210 (of FIG. 1) of radar antenna 200 (of FIG. 1) when antenna 200 (in FIG. 1) is in a stowed position. Legs 120, 130, 140 (of FIG. 1) of fixture 100 (of FIG. 1) are rigidly attached to existing mounting points (not shown) on antenna 200 (of FIG. 1) such that rigid frame 110 (of FIG. 1) is generally parallel to the plane of front face 210 (of FIG. 1) of antenna 200 (FIG. 1). At block 320, optical source 160 (of FIG. 1) is caused to emit light beam 165 (of FIG. 1) generally in a direction toward target 170 (of FIG. 1). When antenna 200 (of FIG. 1) is in a stowed position, and no external forces are acting on fixture 100 (of FIG. 1), flexible member 150 (of FIG. 1) is generally aligned with rigid frame 110 (of FIG. 1), which, in turn, is generally parallel to the plane of front face 210 (of FIG. 1) of antenna 200 (of FIG. 1). Optical source 160 (of FIG. 1) and target 170 (of FIG. 1) are so disposed that light beam 165 (of FIG. 1) emitted by optical source 160 (of FIG. 1) is incident on target 170 (of FIG. 1) when flexible member 150 (of FIG. 1) is generally aligned with rigid frame 110 (of FIG. 1). Light beam 165 (of FIG. 1) incident on target 170 (of FIG. 1), therefore, indicates that flexible member 150 (of FIG. 1), and therefore, rigid frame 110 (of FIG. 1) and front face 210 (of FIG. 1), are flat to an acceptable degree. The laser preferably includes an adjustable head that can be pointed via screws, for example, in the front of the laser. The flexible member may be adapted as a field replaceable unit.

At block 330, the actuators (not shown) are activated by an operator to elevate radar antenna 200 (of FIG. 1) from the stowed position to an operational position. The operator verifies, at block 340, whether light beam 165 (of FIG. 1) emitted from optical source 160 (of FIG. 1) is incident on target 170 (of FIG. 1). If light beam 165 (of FIG. 1) is incident on target 170 (of FIG. 1), it implies that flexible member 150 (of FIG. 1) is generally aligned with rigid frame 110 (of FIG. 1), and that the flatness of radar antenna 200 (of FIG. 1) is acceptable. At block 360, the alignment fixture 100 (of FIG. 1) may be removed from antenna 200 (of FIG. 1). If, however, light beam 165 (of FIG. 1) is not incident on target 170 (of FIG. 1), at block 340, it implies that flexible member 150 (of FIG. 1) has flexed relative to rigid frame 110 (of FIG. 1), which may be a result of a twist experienced by front face 210 (of FIG. 1) of antenna 200 (of FIG. 1). Such a twist may occur because of uneven elevation of antenna 200 (of FIG. 1). In such a case, depending on the direction of the deviation of light beam 165 (of FIG. 1) from target 170 (of FIG. 1), only one of the actuators (not shown) may be selectively activated to adjust the position of radar antenna 200 (of FIG. 1), at block 350, until light beam 165 (of FIG. 1) is incident on target 170 (of FIG. 1). Thus, a single individual with minimal training may align, relatively quickly, the flatness of radar antenna 200 (of FIG. 1) using only alignment fixture 100 (of FIG. 1) in the field.

Figure 3:
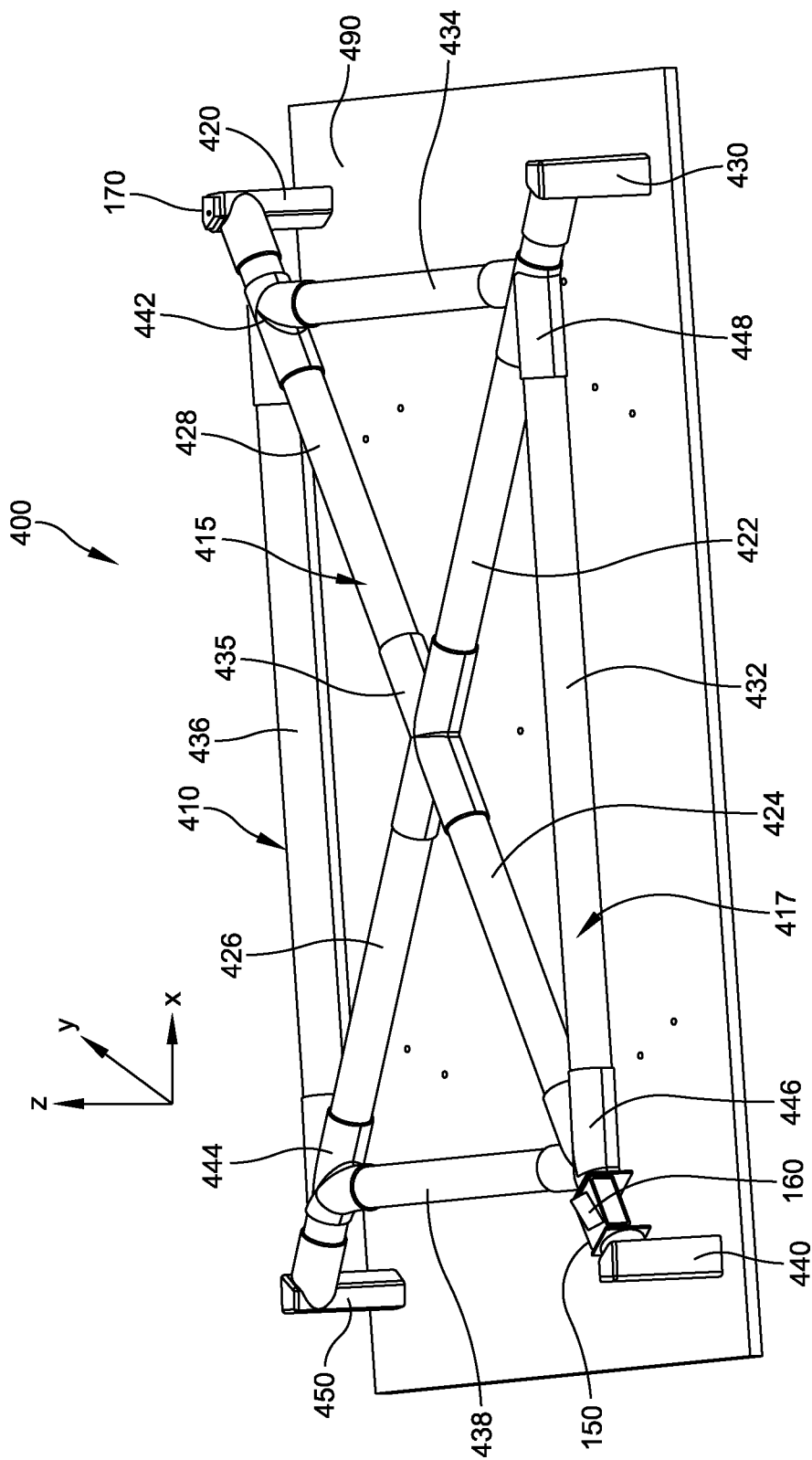
FIG. 3 illustrates an alignment apparatus, according to another embodiment of the invention.

Referring now to FIG. 3, alignment fixture or apparatus 400 is illustrated, according to another embodiment of the invention. Apparatus 400 includes a rigid frame 410, a flexible member 150, four legs 420, 430, 440, 450, optical source 160 and target 170, according to an exemplary embodiment of the invention. In one configuration, rigid frame 410 includes an "X-shaped" rigid structure 415 and a rectangular frame 417 rigidly coupled to rigid structure 415. Rigid structure 415 includes an "X-shaped" holding member 435 and four segments 422, 424, 426, 428 rigidly coupled to holding member 435, according to an exemplary embodiment of the invention. In one configuration, rectangular frame 417 includes four segments 432, 434, 436, 438 and four corner members 442, 444, 446, 448. Each of corner members 442, 444, 446, 448 is rigidly coupled to two segments of rectangular frame 417 and one segment of "X-shaped" structure 415 as illustrated in FIG. 3, according to an exemplary embodiment of the invention.

In one configuration, legs 420, 430, 450 are rigidly coupled to segments 428, 422, 426, respectively. In the illustrated embodiment, fourth leg 440 is coupled to flexible member 150, which, in turn, is coupled to corner member 446 of rectangular frame 417. Four legs 420, 430, 440, 450 are configured to be rigidly, but removably, mounted to a radar array antenna (not shown). In an exemplary embodiment, each of four legs 420, 430, 440, 450 may be rigidly mounted to the antenna (not shown) using fasteners (not shown) such as nuts and bolts at pre-existing mounting points (not shown) on the antenna (not shown). Legs 420, 430, 440, 450 are configured such that rigid frame 410 lies in a plane generally parallel to the front face (not shown) of the antenna (not shown) when alignment fixture 400 is mounted to the antenna (not shown). In the illustrated embodiment, rigid frame 410 lies in a plane generally parallel to surface 490. If the front face (not shown) of the antenna (not shown) is subject to a twisting force, for example, as a result of a misalignment between the actuators (not shown) used to elevate the radar antenna (not shown), flexible member 150 flexes relative to rigid frame 410. The flexure of flexible member 150 causes light beam 165 (of FIG. 1) to diverge from target 170. The greater the twist in the front face of the antenna (not shown), the greater the flexure of flexible member 150. The greater the flexure of flexible member 150, the greater the divergence of light beam 165 (of FIG. 1) from target 170.

Figure 4:
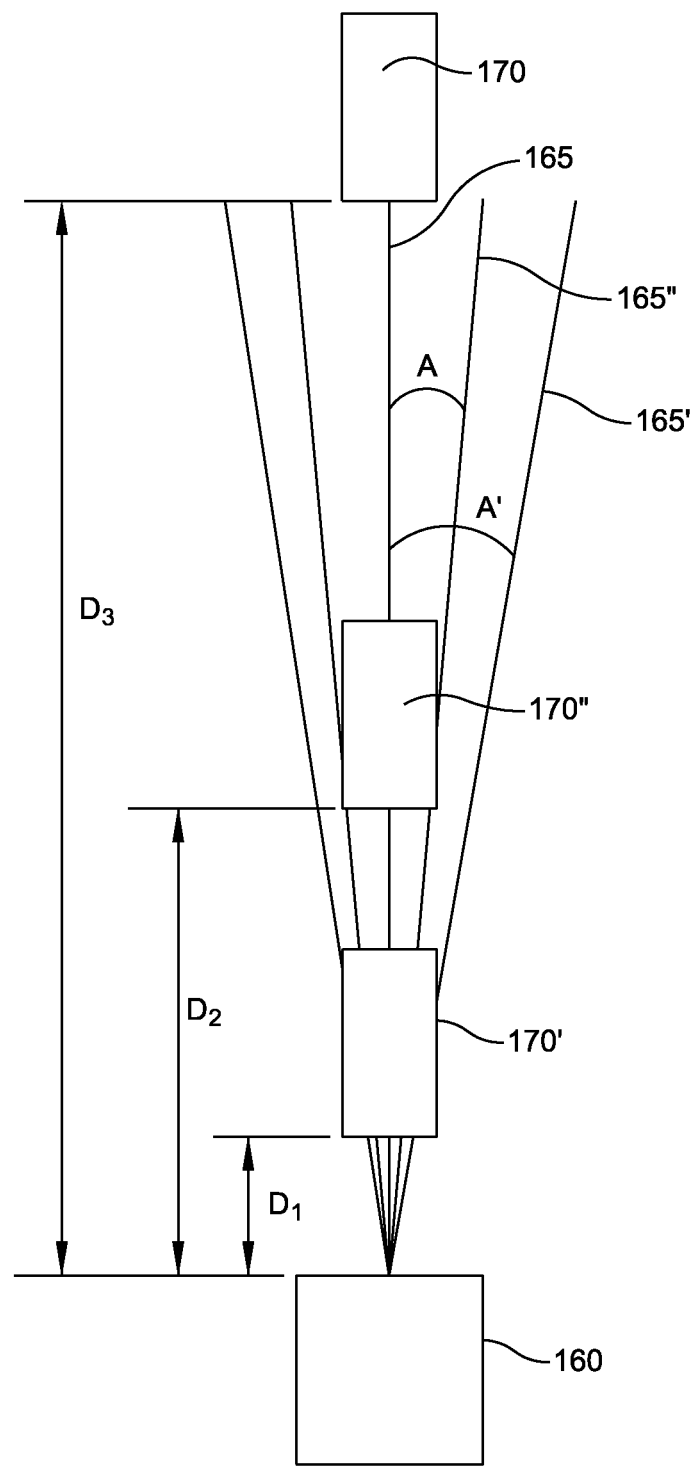
FIG. 4 schematically illustrates the sensitivity of the combination of the optical source and the target of FIG. 1 as a function of the distance between the optical source and the target, according to an embodiment of the invention.

Referring now to FIG. 4, the relationship of the distance between optical source 160 and target 170 and the sensitivity of the combination of optical source 160 and target 170 is schematically illustrated. As is known in the art, an angular divergence magnifies with the distance. FIG. 4 illustrates schematically optical source 160, light beams 165, 165', 165", and targets 170, 170', 170". Light beam 165' diverges from light beam 165 by an angle of A' and light beam 165" diverges from light beam 165 by an angle A. Target 170' is at a distance $D_1$ from optical source 160; target 170" is at a distance $D_2$ from optical source 160; and target 170 is at a distance $D_3$ from optical source 160, wherein distance $D_1$ is the smallest, distance $D_3$ is the greatest and distance $D_2$ smaller than distance $D_3$ but greater than distance $D_1$. For target 170' at distance $D_1$, light beams 165, 165', and 165" will all be incident on target 170'. Thus, an individual inspecting the combination of optical source 160 and target 170' would fail to detect the angular divergences of light beams 165' or 165" from the ideal path of light beam 165. As the distance increases from $D_1$ to $D_2$, light beam 165' will no longer be incident on target 170"; however, light beam 165" would still be incident on target 170". Thus, while the sensitivity of the combination of optical source 160 and target 170" to divergent light beams is greater than that of the combination of optical source 160 and target 170', is still not sufficient to detect the divergence between light beams 165" and 165. Finally, as the distance increases from $D_2$ to $D_3$, only light beam 165 will be incident on target 170. Thus, the greater the distance between optical source 160 and target 170 on apparatus 100 or 410, the greater the sensitivity of the combination of optical source 160 and target 170 to any divergence of light beam 165 from its ideal path.

In one configuration, for a generally rectangular rigid frame 410, the greatest distance between optical source 160 and target 170 may be obtained by placing them diagonally across each other, as illustrated in FIGS. 1 and 3. Depending on the requirements of a given application, optical source 160 and target 170 may be placed in a different configuration, without departing from the scope of the invention.

Referring back to FIG. 3, segments 422, 424, 426, 428 of X-shaped rigid structure 415 and segments 432, 434, 436, 438 of rectangular frame 417 may be manufactured using carbon fiber composites and other carbon composites, according to an embodiment of the invention. Holding member 435 and corner members 442, 444, 446, 448 may be manufactured using the same or similar materials to mitigate issues arising from thermal expansion.

An advantage of alignment fixture 100 is that the flatness of a radar array antenna may be aligned in the field. No other sophisticated equipment is required for aligning the flatness of the antenna. Since alignment fixture 100 is light-weight, by way of non-limiting example, around fifty (50) pounds (lbs), a single individual may be use alignment fixture 100 to align the flatness of a radar array antenna. By observing the light beam 165 and target 170, an individual can selectively activate the actuators and align the flatness relatively quickly.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. An apparatus configured to be mounted to a radar array antenna having a generally planar front face for aligning the radar antenna, said apparatus comprising:
    a rigid frame defining a plane generally parallel to the front face of the antenna when said rigid frame is mounted to the antenna;
    a flexible member associated with said rigid frame and configured to flex relative to said rigid frame;
    an optical source for emitting a light beam; and
    a target,
    wherein one of said optical source and said target is associated with said flexible member and the other of said optical source and said target is associated with said rigid frame, and
    wherein a distance between the path of said light beam and said target is indicative of a degree of misalignment between said flexible member and said rigid frame.

2. The apparatus of claim 1, further comprising:
    first, second and third legs for rigidly mounting said rigid frame to the antenna and extending from said rigid frame; and
    a fourth leg for mounting said rigid frame to the antenna and associated with said rigid frame via said flexible member.

3. The apparatus of claim 2, wherein said rigid frame comprises first and second beams in an X-shaped configuration.

4. The apparatus of claim 3, wherein said first and third legs are associated with first and second ends of said first beam, respectively; and
    wherein said second and fourth legs are associated with first and second ends of said second beam, respectively.

5. The apparatus of claim 4, wherein said optical source is associated with said first end of said second beam, and
    wherein said target is associated with said second end of said second beam.

6. The apparatus of claim 5, wherein a ratio of the length of said second beam of said rigid frame and the length of said flexible member ranges from about 40 to 60.

7. The apparatus of claim 5, wherein a ratio of the stiffness of said second beam and the stiffness of said flexible member ranges from about 5 to 20.

8. The apparatus of claim 3, wherein said rigid frame further comprises a generally rectangular frame rigidly coupled to said first and second beams.

9. An alignment apparatus for aligning an elevation system of a radar array antenna comprising:
    a generally planar, rigid frame for mounting to a front face of the antenna;
    first, second and third legs rigidly attached to said rigid frame and configured to rigidly attach to the antenna;
    a flexible member associated with said rigid frame;
    a fourth leg associated with said flexible member and configured to rigidly attach to the antenna;

an optical source; and a target, wherein one of said optical source and said target is associated with said flexible member, wherein the other of said optical source and said target is associated with said rigid frame, and wherein said optical source and said target are configured to cooperatively indicate any misalignment of said flexible member relative to said rigid frame.

10. The alignment apparatus of claim 9, wherein said rigid frame comprises first and second beams in an X-shaped configuration.

11. The alignment apparatus of claim 10, wherein said first leg extends from a first end of said first beam, wherein said second leg extends from a first end of said second beam, and wherein said third leg extends from a second end of said first beam.

12. The alignment apparatus of claim 10, wherein said flexible member is associated with a second end of second beam.

13. The alignment apparatus of claim 12, wherein said one of the optical source and the target is disposed about said first end of said second beam, and wherein the other of the optical source and the target is disposed about said flexible member.

14. The alignment apparatus of claim 12, wherein said first and second beams comprise a first composite material, and wherein said flexible member comprises a second composite material, said second composite material being flexible relative to said first composite material.

15. The alignment apparatus of claim 9, wherein said target comprises an optical sensor for sensing a light beam emitted by said optical source.

16. A method for adjusting planar alignment of a front face of a radar array antenna, the method comprising the steps of:

rigidly mounting an alignment apparatus spanning across the front face of the antenna, said antenna being in a stowed position, wherein said alignment apparatus comprises:

a rigid frame configured to be mounted to said antenna;

first, second, and third legs rigidly associated with said rigid frame;

a fourth leg flexibly associated with said rigid frame;

a flexible member for flexibly associating said fourth leg with said rigid frame, said flexible member being flexible relative to said rigid frame, an optical source; and a target, wherein, one of said optical source and said target is associated with said flexible member and the other of said optical source and said target is associated with rigid frame, causing an actuator to raise the antenna from said stowed position to a generally deployed position;

causing said optical source to emit a light beam generally toward said target; and if said light beam is not incident upon said target, further causing said actuator to adjust the position of the antenna until said light beam is incident upon said target.

17. The method of claim 16, wherein the mounting step comprises the step of rigidly attaching said first, second, third and fourth legs to the antenna.

18. The method of claim 16, wherein said rigid frame comprises first and second beams in an X-shaped configuration.

19. The method of claim 17, wherein said optical source is rigidly coupled to said flexible member, and wherein said target is associated with a second end of said first beam.

20. The method of claim 19, wherein said target is rigidly associated with one of said first, second and third legs.

* * * * *